US010601478B2

(12) United States Patent
Kapetanovic (10) Patent No.: US 10,601,478 B2
(45) Date of Patent: Mar. 24, 2020

(54) MECHANISM FOR SWITCHING BETWEEN UPLINK AND DOWNLINK TRAINING IN HYBRID BEAMFORMING SYSTEMS (71) Applicant: Telefonaktiebolaget LM Ericsson (publ), Stockholm (SE)

(72) Inventor: Dzevdan Kapetanovic, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/344,536

(22) PCT Filed: Oct. 17, 2017

(86) PCT No.: PCT/EP2017/076418
§ 371 (c)(1),
(2) Date: Apr. 24, 2019

(87) PCT Pub. No.: WO2018/082910
PCT Pub. Date: May 11, 2018

(65) Prior Publication Data
US 2019/0305836 A1    Oct. 3, 2019

Related U.S. Application Data

(60) Provisional application No. 62/416,493, filed on Nov. 2, 2016.

(51) Int. Cl.
*H04B 7/02* (2018.01)
*H04B 7/06* (2006.01)
(Continued)

(52) U.S. Cl.
CPC ......... *H04B 7/0617* (2013.01); *H04B 7/0456* (2013.01); *H04B 7/0695* (2013.01); *H04B 7/088* (2013.01); *H04B 7/0417* (2013.01)

(58) Field of Classification Search
CPC .... H04B 7/0617; H04B 7/0695; H04B 7/088; H04B 7/0456; H04B 7/0417
See application file for complete search history.

(56) References Cited

U.S. PATENT DOCUMENTS 6,694,155 B1    2/2004  Chin et al.
2006/0104382 A1  5/2006  Yang et al.
(Continued)

OTHER PUBLICATIONS

Molisch, A. et al., "Hybrid Beamforming for Massive MIMO—A Survey", IEEE Communications Magazine, vol. 55 Issue 9, Apr. 30, 2017, pp. 1-13, IEEE.
(Continued)

*Primary Examiner* — Dhaval V Patel
(74) *Attorney, Agent, or Firm* — Coats+ Bennett, PLLC (57) ABSTRACT

Methods and apparatus for selecting between downlink beamforming training and uplink beamforming training for hybrid beamforming. The decision whether to perform downlink beamforming training or uplink beamforming training for hybrid beamforming can be used by a network node to reduce training overhead and increase system capacity. A selection value is computed, indicative of the relative costs of signaling overhead for downlink beamforming training and uplink beamforming training to support downlink transmissions by the network node to the group of wireless devices using hybrid beamforming. The selection between uplink beamforming training and downlink beamforming training is based on the selection value.

27 Claims, 7 Drawing Sheets (51) Int. Cl.
*H04B 7/0456* (2017.01)
*H04B 7/08* (2006.01)
*H04B 7/0417* (2017.01)

(56) References Cited

U.S. PATENT DOCUMENTS

2008/0260059 A1* 10/2008 Pan .................. H04L 1/0025
                                              375/260
2015/0092621 A1   4/2015 Jalloul et al.
2016/0099763 A1   4/2016 Chen
2016/0142922 A1*  5/2016 Chen ................ H04B 7/0695
                                              375/267

OTHER PUBLICATIONS

Alkhateeb, A. et al., "Channel Estimation and Hybrid Precoding for Millimeter Wave Cellular Systems", IEEE Journal of Selected Topics in Signal Processing, vol. 8 No. 5, Oct. 1, 2014, pp. 831-846, IEEE.

* cited by examiner

MECHANISM FOR SWITCHING BETWEEN UPLINK AND DOWNLINK TRAINING IN HYBRID BEAMFORMING SYSTEMS

TECHNICAL FIELD

The present disclosure relates generally to multi-antenna communication systems and, more particularly, to wireless communication networks using large-scale antenna arrays and hybrid beamforming.

BACKGROUND

Multiple input, multiple output (MIMO) is one technology used in wireless communication systems to meet the increasing demand for high speed data. Generally, MIMO systems employ multiple antennas at the transmitter and the receiver to take advantage of the multipath channel to increase system capacity. MIMO has become an essential element of wireless communication systems including wireless local area networks (WLANs) based on the IEEE (Institute of Electrical and Electronics Engineers) 802.11 family of standards, Long Term Evolution (LTE) networks, and Worldwide Interoperability for Microwave Access (WiMAX) networks.

In fifth generation (5G) and next generation (NG) wireless communication systems, massive MIMO involving large-scale antenna arrays and beamforming will be used to combat severe path loss expected at higher frequencies. In massive MIMO systems, the base station (BS) or access point (AP) may be equipped with hundreds of antenna elements. In conventional MIMO and beamforming systems, each antenna element uses a separate radio frequency (RF) chain and baseband precoding schemes. Providing separate RF chains for massive MIMO systems results in increased hardware costs and power consumption.

Savings in hardware costs and power consumption can be achieved by having less radio frequency (RF) chains than the number of antennas. This principle is employed in the IEEE 802.11ay standard, where the number of RF chains in the base station or access point can be as low as 8, while the number of antennas can be as high as 256. In this case, it is not possible perform digital beamforming across all antennas. Rather, the digital beamforming is performed across the RF chains, and analog beamforming is then used to map the output of the RF chains to the antenna elements. This concept, referred to as hybrid beamforming, is a hybrid between digital beamforming and analog beamforming.

One aspect of hybrid beamforming is choosing analog phases that are well adjusted to the physical channel (i.e., result in an analog beam that "points" toward a desired user equipment (UE) or UEs. For this reason, as in the IEEE 802.11ad and future IEEE 802.11ay standard, there is a downlink (DL) training phase associated with the analog beamforming part of the hybrid beamforming method, in which different analog beams are transmitted by the base station and received with analog combiners at the UE (receive analog beamforming). In this way, the base station and UE can learn the best transmit and receive analog beams, which are then used during downlink transmission and on which digital beamforming is applied on top. Typically, as in 802.11ad, the analog beamforming training is performed with a codebook-based method, where the base station and UE are equipped with finite codebooks from which the beams are chosen.

SUMMARY

Exemplary embodiments of the disclosure comprise methods and apparatus for selecting between downlink beamforming training and uplink beamforming training for hybrid beamforming. The decision whether to perform downlink beamforming training or uplink beamforming training for hybrid beamforming can be used by a network node to reduce training overhead. Depending on the number of RF chains at the network node and the total number of RF chains at the wireless devices to be served in the downlink, uplink beamforming training can significantly reduce the training overhead compared to downlink beamforming training in some scenarios. As a result, the overall throughput of the wireless communication network can be increased, especially in the cases when the beamforming training occurs frequently enough (small channel coherence time) for the training overhead to make up a significant portion of the transmission time.

According to an aspect of the invention, there is provided a method implemented by a network node in a wireless communication network using hybrid beamforming. The method comprises: determining a group of one or more wireless devices to be trained; computing a selection value indicative of the relative costs of signaling overhead for downlink beamforming training and uplink beamforming training to support downlink transmissions by the network node to the group of wireless devices using hybrid beamforming; and selecting between uplink beamforming training and downlink beamforming training based on the selection value.

In embodiments, the method the computing a selection value may comprise computing a ratio of the signaling overhead for downlink beamforming training to the signaling overhead for uplink beamforming training, wherein said ratio is used as a selection value. The ratio may comprise computing the ratio based on a number of radio frequency transmitter chains at the network node, a number of wireless devices in said group, and a minimum number of radio frequency receiver chains for the group of wireless devices. Alternatively, the computing of the ratio may comprise computing the ratio based on a number of radio frequency transmitter chains at the network node, and a maximum ratio for the group of wireless devices of receive codebook size to number of radio frequency receiver chains.

In further embodiments, the computation of the ratio is further based on codebook sizes for codebooks used respectively by the network node and the group of wireless devices.

In further embodiments, the computation of the ratio is further based on signaling overhead for feedback from said group of wireless devices to said network node.

In some embodiments, the selection value represents the relative costs in terms of time resources for downlink beamforming training and uplink beamforming training.

In some embodiments, computing the selection value comprises: computing a first value representative of the signaling overhead for downlink beamforming training; computing a second value representative of the signaling overhead number for uplink beamforming training; and computing the selection value based on the first and second values.

The first and second values may represent a number of time slots needed respectively for downlink beamforming training and uplink beamforming training, and the selection value may be computed as a ratio of the first and second values.

In further embodiments, the first value is computed based on a size of a transmit codebook for the network node, a common receive codebook size for the group of wireless devices, and a minimum number of receiver chains for the group of wireless devices; and the second value is computed based on a size of a common transmit codebook for the group of wireless devices, a receive codebook size for the network node; and a number of receiver chains for the network node.

In other embodiments, the first value is computed based on a size of a transmit codebook for the network node, and maximum ratio for the group of wireless devices of receive codebook size to number of receiver chains; and the second value is computed based on a size of a common transmit codebook for the group of wireless devices, a receive codebook size for the network node, and a number of receiver chains for the network node.

In some embodiments, selecting between uplink beamforming training and downlink beamforming training based on the selection value comprises: determining a selection threshold; comparing the selection value to the selection threshold; and selecting between downlink beamforming training and uplink beamforming training based on the comparison of the selection value to the selection threshold.

In further embodiments, the selected one of downlink beamforming training or uplink beamforming training is used to determine one or more beamforming codes for downlink transmissions to one or more wireless devices in said group of wireless devices.

According to a further aspect of the invention, there is provided a network node in a wireless communication network using hybrid beamforming, the network node comprising: an interface circuit for communicating with wireless devices; and a processing circuit configured to: determine a group of one or more wireless devices to be trained; compute a selection value indicative of the relative costs of signaling overhead for downlink beamforming training and uplink beamforming training to support downlink transmissions by the network node to the group of wireless devices using hybrid beamforming; and select between uplink beamforming training and downlink beamforming training based on the selection value.

In further embodiments, the processing circuit is configured to operate as mentioned in the methods above.

According to a further aspect of the invention, there is provided a computer program comprising executable instructions that, when executed by a processing circuit in a network node, causes the network node to perform any one of the methods as mentioned above.

According to a further aspect of the invention, there is provided a carrier containing a computer program as mentioned above, wherein the carrier is one of an electronic signal, optical signal, radio signal, or computer readable storage medium network node.

According to a further aspect of the invention, there is provided a non-transitory computer-readable storage medium containing a computer program comprising executable instructions that, when executed by a processing circuit in a network node causes the network node to perform any one of the methods as mentioned above.

DETAILED DESCRIPTION

Figure 1:
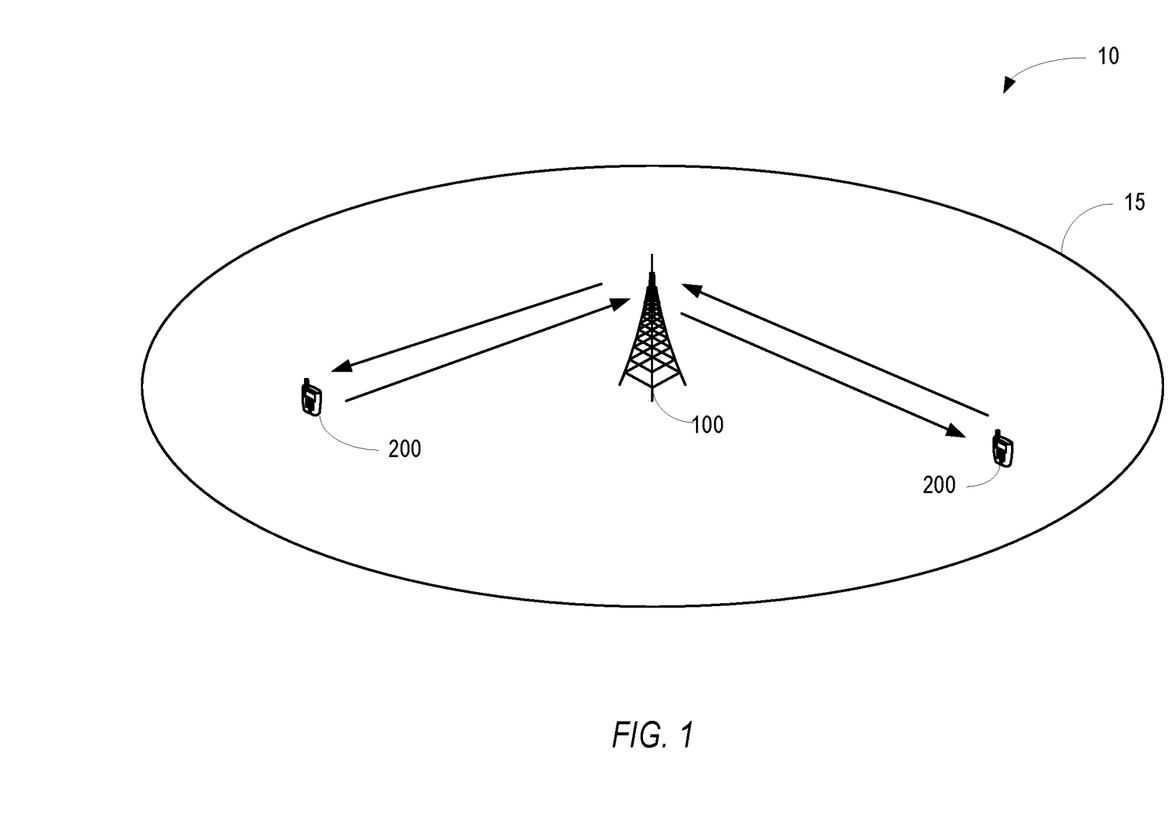
FIG. 1 illustrates a wireless communication network using large scale antenna arrays and hybrid beamforming.

Referring now to the drawings, FIG. 1 illustrates an exemplary communication network 10 employing large scale antenna arrays and hybrid beamforming. The wireless communication network comprises a network node 100 in a radio access network (RAN) and a plurality of wireless devices 200 that communicate with the network node 100 over a wireless communication channel. The network node 100 may, for example, comprise a base station in a cellular communication network or an access point in a WLAN. The wireless device 200 may comprise a mobile phone, smart phone, laptop computer, notebook computer, machine-type communication (MTC) device, machine-to-machine communication (M2M) device, or other type of user equipment (UE). Exemplary embodiments of the disclosure will be described below in the context of a 5G or NG (New Generation) wireless communication network. Those skilled in the art will appreciate, however, that the disclosure is not limited to such wireless communication networks based on the 5G or NG standards, and that the disclosure is more generally applicable to any wireless communication networks 10 using hybrid beamforming in combination with large scale antenna arrays.

Hybrid beamforming is a beamforming technique used where the number of RF, radio frequency, chains in the network node 100 is less than the number antenna elements in the antenna array at the network node 100. In this case, it is not possible perform digital beamforming across all antenna elements. Rather, the digital beamforming is performed across the RF chains, and analog beamforming is then used to map the output of the RF chains to the antenna elements.

Figure 2:
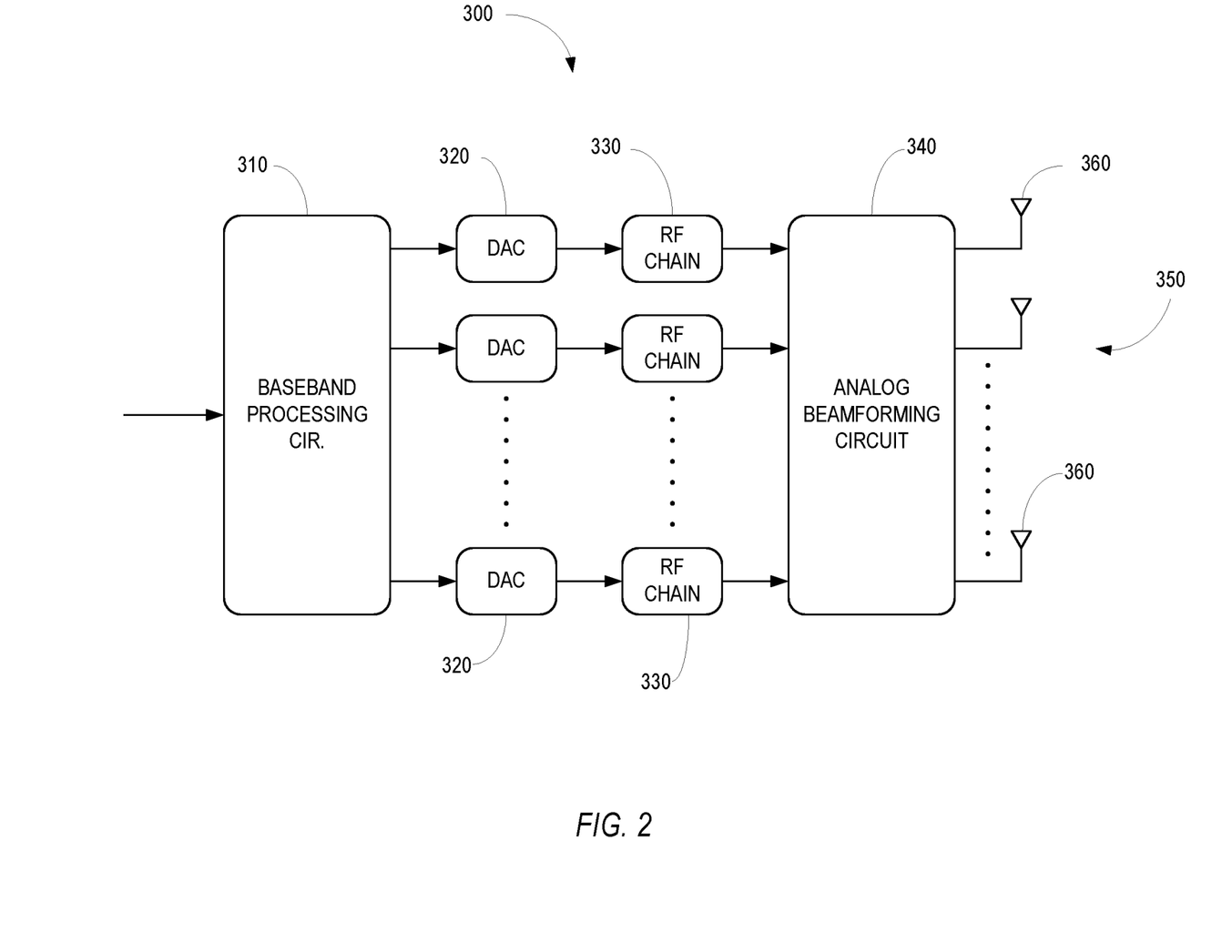
FIG. 2 illustrates a transmitter for a network node in a wireless communication network hybrid beamforming.
Figure 3:
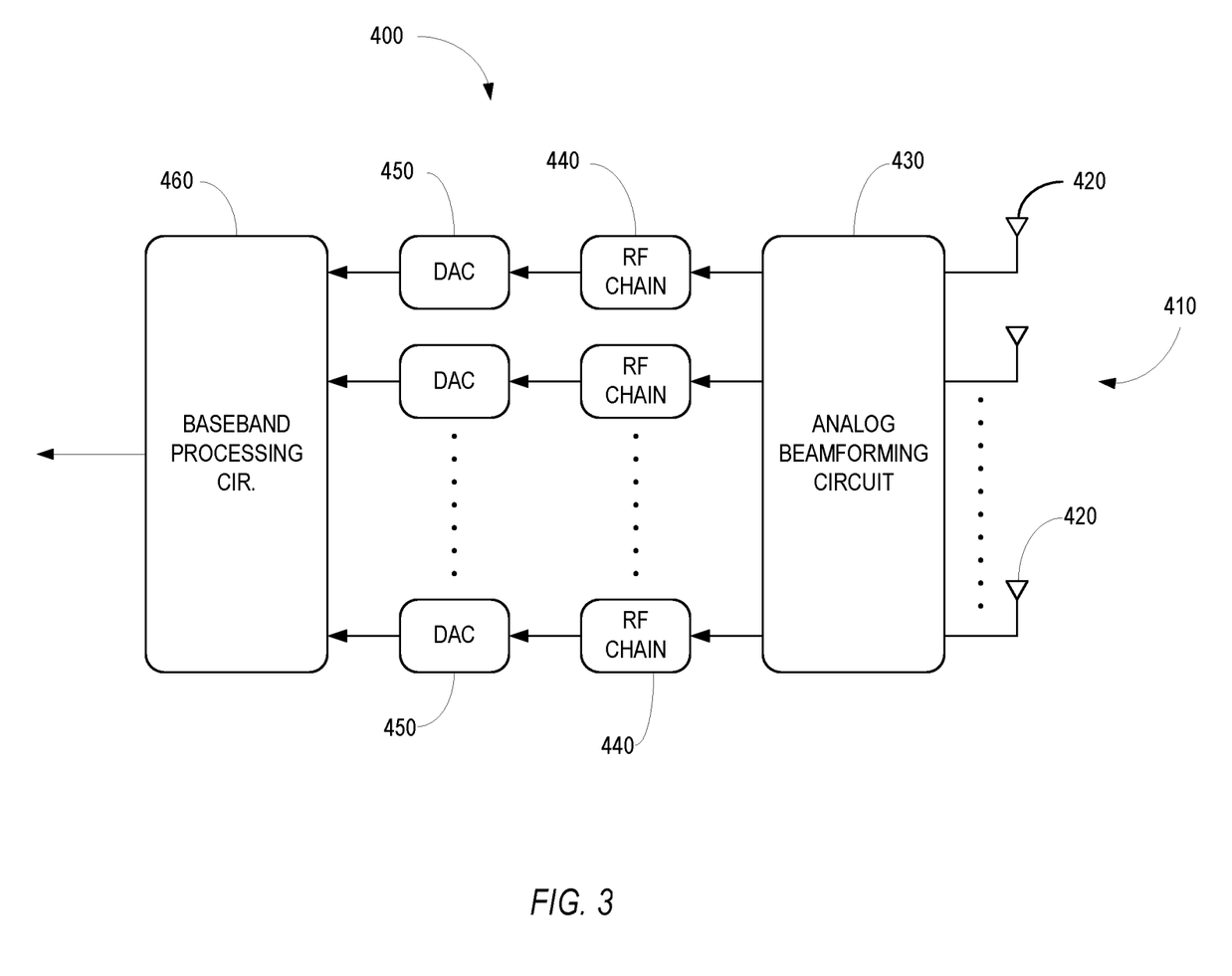
FIG. 3 illustrates a receiver for a wireless device in a wireless communication network using hybrid beamforming.

FIGS. 2 and 3 illustrate respectively a transmitter 300 and receiver 400 used for hybrid beamforming. For downlink transmissions, the transmitter 300 is a part of the network node 100 and the receiver 400 is part of the wireless device 200. For uplink transmissions, the transmitter 300 is a part of the wireless device 200 and the receiver 400 is part of the network node 100.

The transmitter 300 comprises a baseband processing circuit 310, digital-to-analog conversion (DAC) circuits 320, a plurality of RF chains 330, an analog beamforming circuit 340, and an antenna array 350 including a plurality of antenna elements 360. The number of antenna elements 360 in the antenna array 350 may be in the hundreds. The antenna elements 360 in the antenna array 350 are divided into subarrays and a separate RF chain 330 is provided for subarray. The baseband processing circuit 310 applies digital beamforming to the signals fed to each RF chain 330. The DAC circuits 320 convert the digital baseband signals output from the baseband processing circuit 310 to analog form. The RF chains 330 filter, amplify, and upconvert the analog signals to generate RF signals. The analog beamforming circuit 340 applies analog beamforming to the RF signals and maps the resulting transmit signals to the antenna elements 360 in the antenna array 350. The transmitted signals are transmitted through the communication channel to a wireless device 200 wireless device 200 for downlink transmission or to a network node 100 for uplink transmissions.

The receiver 400 comprises an antenna array 410 having a plurality of antenna elements 420, an analog beamforming circuit 430, a plurality of RF chains 440, analog-to-digital converter (ADC) circuits 450, and a baseband processing circuit 460. The signals received by the antenna elements 420 in the antenna array 410 are applied to the analog beamforming circuit 430, which performs analog receive beamforming on the received signals to generate received RF signals that are input to respective RF chain 440. The RF chains 440 filter, amplify, and downconvert the received RF signals to baseband. The ADC circuits 450 convert the received baseband signals to digital form for processing by the baseband processing circuit 460. The baseband processing circuit 460 then performs digital beamforming on the received digital baseband signals.

In order to perform hybrid beamforming for downlink transmissions from the network node 100 to the wireless devices 200, the network node 100 and wireless device 200 would ideally select the beams that produce the largest channel gain. It will be appreciated that the phrase "selecting a beam" as used herein is synonymous with selecting a beamforming code. The process of selecting the beam pair (transmit and receive) for the network node 100 and wireless device 200 producing the largest channel gain is known as beamforming training. Ideally, the beamforming training should produce the beam direction pair that gives the highest channel gain. In actual practice, the beamforming training may not result in the beam pair with the highest channel gain. Beamforming training for downlink transmission between the network node 100 and wireless devices 200 may be performed in the downlink or in the uplink. For downlink beamforming training, the network node 100 sends beamforming training signals on a predefined set of transmit beams to a group of wireless devices 200. The wireless devices 200 receive the beamforming training signals transmitted by the network node 100 on each transmit beam using a predefined set of receive beams. The wireless devices 200 send feedback to the network node 100, which uses the feedback to select transmit and/or receive beams used for the downlink transmissions to the wireless devices 200. In some cases, the feedback may comprise channel state information (CSI) for each beam pair. In other embodiments, the wireless devices 200 may feedback an index or other value indicating the "best" transmit beam and/or receive beam. For a complete search, the training signal transmitted on each transmit beam should be received by the wireless device 200 on each receive beam.

While downlink beamforming training is typically used, uplink beamforming training may also be used if channel reciprocity can be guaranteed to some level of accuracy. With uplink beamforming training, the wireless devices 200 transmit beamforming training signals on the uplink to the network node 100 using a predefined set of beams. The network node 100 receives the training signals on a predefined set of receive beams. The network node 100 then processes the received beamforming signals to determine a transmit beam and/or receive beam to use for downlink transmissions to the user equipment 100.

A comparison between downlink and uplink training will show different advantages and disadvantages. With downlink training an advantage is that it is transparent to DL-UL channel reciprocity. On the other hand, the training overhead can be large, particularly for good channel knowledge, which may result in outdated channel state information, CSI. With uplink training advantages are that it can substantially reduce training overhead compared to downlink training. No channel quantization and feedback from the wireless devices is required. If calibrated, the same performance can be achieved as with downlink training (let uplink codebooks be equal to the downlink codebooks). On the negative side, if not calibrated, the uplink training can decrease performance (resulting in that uplink codebooks are not equal to the downlink codebooks).

However beamforming training is performed, the network node 100 may select a transmit beam and/or receive beam from predefined beamforming codebooks. In other embodiments, the network node 100 may use channel state information (CSI) derived from the received beamforming training signals to determine a transmit beam for downlink transmission to the wireless device 200. In the case of uplink beamforming training, the network node 100 may signal a selection for the receive beam to the wireless devices 200.

The beamforming training process can be time consuming and can result in long delays in establishing connections between a wireless device 200 and a network node 100. This problem is particularly acute when the network node 100 needs to train many wireless devices 200. In some scenarios, it may be advantageous to use uplink beamforming training rather than downlink beamforming training to select or otherwise determine the beams used for downlink transmissions from the network node 100 to the wireless device 200. In exemplary embodiments described below, techniques are described for dynamically selecting between downlink beamforming training and uplink beamforming training.

Consider a single cell with a network node 100 and a group of wireless devices 200 to be trained. The network node 100 is equipped with $N_{RF}^{BS}$ chains and $N^{BS}$ antennas, while the jth wireless device 200 is equipped with $N_{RF}^{j}$ RF chains and $N^{j}$ antennas, where $N_{RF}^{BS} \leq N^{BS}$ and $N_{RF}^{j} \leq N^{j}$. Furthermore, the network node 100 has a transmit codebook of beams, $U_{Tx}^{BS}$, and a receive codebook of beams, $U_{Rx}^{BS}$. Upon a downlink transmission to wireless devices 200, the network node 100 chooses a set of beams from $U_{Tx}^{BS}$, each carrying a symbol to a certain wireless device 200. Upon reception in uplink, the network node 100 chooses a set of beams from $U_{Rx}^{BS}$ that are used to "project" the incoming signal on the $N^{BS}$ antennas down to the $N_{RF}^{BS}$ RF chains. An equivalent situation is at the wireless devices 200, where the jth wireless device 200 has access to a transmit codebook $U_{Tx}^{UE}$ and receive codebook $U_{Rx}^{UE}$. It is assumed that the transmit and receive codebooks are the same at each wireless device 200, which is expected to be the case as this is usually set by the standard. However, if the transmit and receive codebooks are not standardized, it is sufficient that the number of transmit and receive beams at each wireless device 200 is the same, although the beams themselves can differ. This assumption is mainly for simplifying the analysis, although this could be extended to the case when the number of beams at each wireless device 200 is different.

Figure 4:
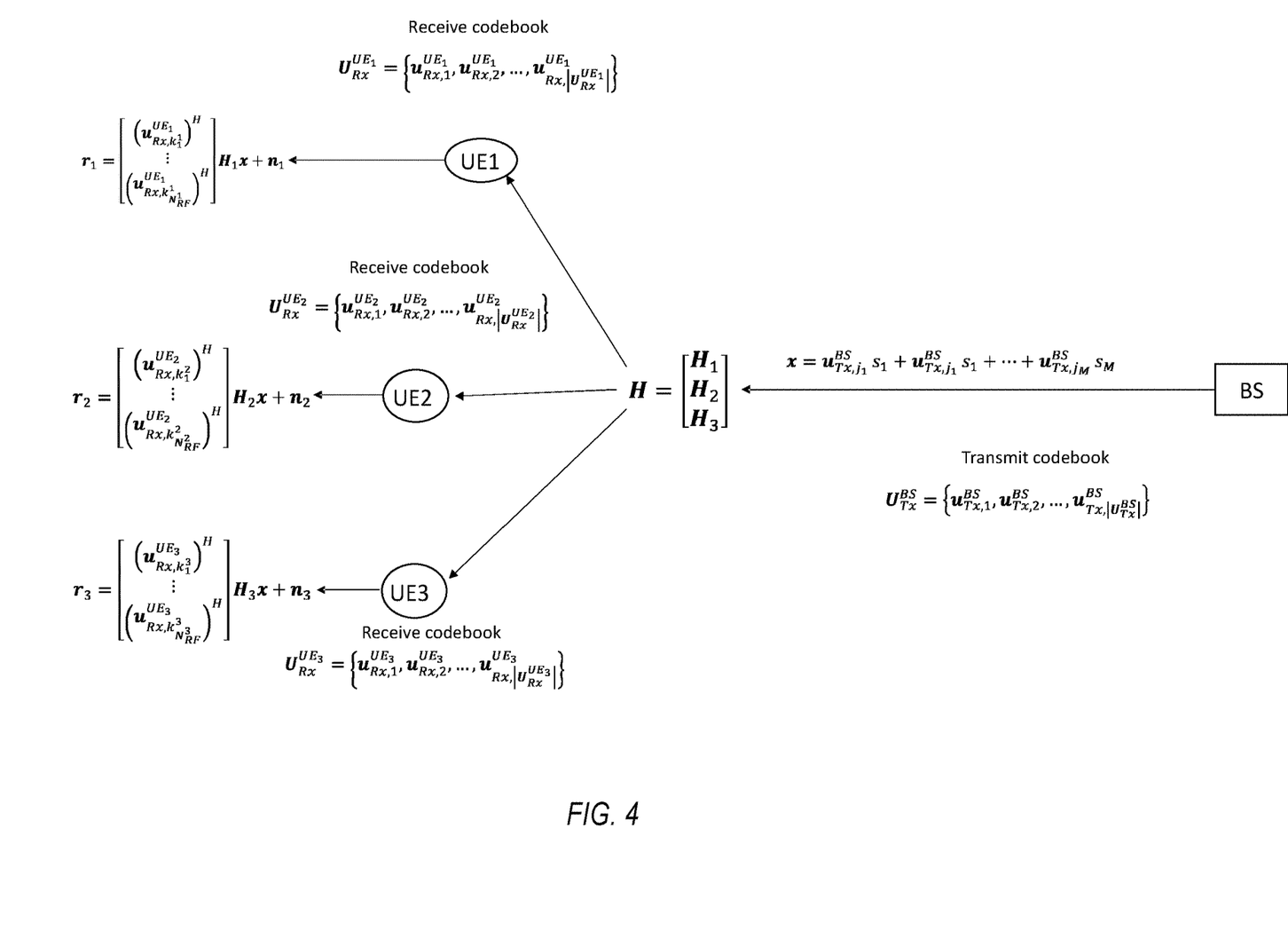
FIG. 4 illustrates downlink beamforming training in a wireless communication network hybrid beamforming.

The (physical) downlink channel between the antennas at the network node 100 and the antennas at the jth wireless device 200 is denoted as $H_j$, and H is the composite channel with all network node 100—wireless device channels stacked in rows. FIG. 4 depicts downlink beamforming training, while FIG. 5 depicts uplink beamforming training.

During downlink beamforming training, shown in FIG. 4, the network node 100 transmits one beam per time slot, which equates to choosing e.g. $s_1=1$ and $s_2= \ldots =s_M=0$ at a given time slot, i.e., activating only one beam at a time. In this example, the term "time slot", refers to a whole Orthogonal Frequency Division Multiplexing (OFDM) symbol in an OFDM transmission, since a beam occupies a whole symbol. Hence, "slots" here simply equate to number of symbols. Wireless device k "listens" how the beam transmitted from the network node 100 projects onto its channel and the $N_{RF}^k$ beams that wireless device k uses for projecting the incoming signal to the $N_{RF}^k$ RF chains. Note that each wireless device 200 chooses its own set of beams from a codebook, and the codebooks can differ between the wireless devices 200. After all beams have been transmitted by the network node 100, each wireless device 200 feeds back some information, referred to herein as feedback or feedback information, about the estimated projections (e.g., the projections themselves, or an indication which projection or projections were strongest, or some other information) to the network node 100. This feedback is sent in separate slots by each wireless device 200. Let $T_f^k$ denote the number of time slots needed for the feedback packet from wireless device k.

Figure 5:
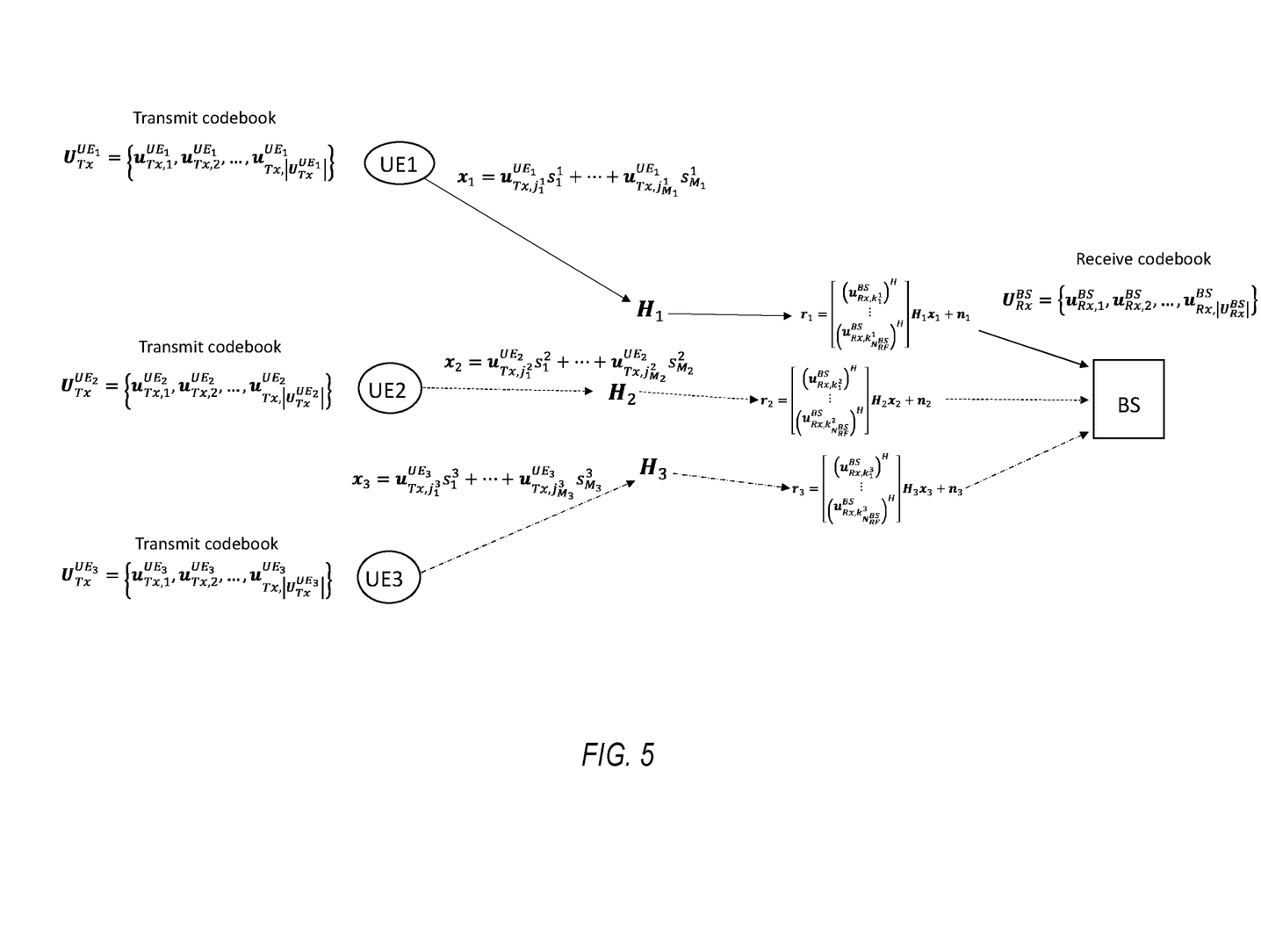
FIG. 5 illustrates uplink beamforming training in a wireless communication network using hybrid beamforming.

For uplink beamforming training, shown in FIG. 5, each wireless device 200 transmits one beam at a time, which equates to choosing e.g. $s_{j_1}^k = 1$ and $s_{j_2}^k = \ldots = s_{j_M}^k = 0$ for wireless device k, and different wireless devices 200 transmit during different time slots (one could as well let them transmit in the same time slots, by using orthogonal codes, but it will take as long time as letting them transmit in different time slots). The network node 100 listens to how each beam from wireless device k projects onto the physical channel $H_k$ and the $N_{RF}^{BS}$ beams chosen for wireless device k from the receiving codebook at the network node 100. In principal, there is no feedback stage necessary during the uplink training. However, in the case when the wireless device 200 is expected to use the transmit beams for reception as well, the network node 100 needs to inform each wireless device 200 which transmit beams it should use for reception. This notification can be accomplished by signaling to each wireless device 200, in the downlink packet, the index of the transmit beam that it should use for receiving the data. This additional indexing overhead is negligible compared to the feedback overhead of $T_f$ time slots with downlink training.

With the above training mechanisms in mind, the signaling overhead for downlink beamforming training and uplink beamforming training may be computed. In the examples, below, the signaling overhead is computed as the number of time slots needed for uplink beamforming training and downlink beamforming training. We start with calculation of downlink beamforming training. The network node 100 needs to transmit the beams from its transmit codebook $U_{Tx}^{BS}$, which takes in total $|U_{Tx}^{BS}|$ time slots. Wireless device k can listen to the projection of each transmit beam onto its channel $H_k$ and onto $N_{RF}^k$ receiving beams at wireless device 200. Hence, to learn the projections of all transmit beams from the network node 100 onto the channel $H_k$ and all the receiving beams at wireless device k, takes $$\frac{|U_{Tx}^{BS}||U_{Rx}^{UE}|}{N_{RF}^k}$$

time slots. Because some wireless devices 200 might have a fewer number of RF chains than others, the network node 100 needs to transmit for as long as the wireless device 200 with the smallest number of RF chains requires (this is the wireless device 200 that takes longest time to train). Hence, the total number of required downlink time slots equals $$\frac{|U_{Tx}^{BS}||U_{Rx}^{UE}|}{\min_k N_{RF}^k} = \frac{|U_{Tx}^{BS}||U_{Rx}^{UE}|}{N_{RF}^m},$$

where we define $$N_{RF}^m \triangleq \min_k N_{RF}^k.$$

After these projections have been obtained by each wireless device 200, they are fed back in a sequential manner (one wireless device 200 at a time), which takes in total $KT_f$ time slots. Hence, the total number of time slots for downlink beamforming training is $$\frac{|U_{Tx}^{BS}||U_{Rx}^{UE}|}{N_{RF}^m} + KT_f$$

time slots. Note that it is the wireless device 200 with the smallest number of RF chains that mainly determines the signaling overhead for downlink beamforming training.

Uplink beamforming training can be performed in a sequential manner, with each wireless device 200 transmitting its transmit beams in the uplink, one at a time. Another alternative is to let the wireless devices 200 transmit beams simultaneously, and separate the beams by using orthogonal beams across time (as usually done in WLAN standards), which anyway results in the same number of training slots as when wireless devices 200 transmit sequentially (sequential transmission is a form of an orthogonal code). Hence, for training overhead calculation, we can without loss of generality assume that the wireless devices 200 train sequentially.

Similar to downlink beamforming training, it takes each wireless device 200 $|U_{Tx}^{UE}|$ time slots to transmit its beams. For each such beam, the network node 100 can listen how the beam projects onto the uplink channel (from that wireless device 200) and $N_{RF}^{BS}$ receive beams simultaneously at the network node 100. Hence, in total, it takes $$\frac{|U_{Tx}^{UE}||U_{Rx}^{BS}|}{N_{RF}^{BS}}$$

time slots to learn all the projections from a single wireless device 200 onto the channel and the receiving beams at the network node 100. Since there are K users, the total number of time slots for uplink beamforming training equals $$K \frac{|U_{Tx}^{UE}||U_{Rx}^{BS}|}{N_{RF}^{BS}}.$$

Based on the calculations above on the number of time slots required for downlink beamforming and unlink beamforming training, we obtain the ratio $$Q_t \stackrel{\text{def}}{=} \frac{\text{\# of } DL \text{ training time slots}}{\text{\# of } UL \text{ training time slots}} = \qquad \text{Eq. (1)}$$

-continued $$\frac{\frac{|U_{Tx}^{BS}||U_{Rx}^{UE}|}{N_{RF}^{m}} + KT_f}{K\frac{|U_{Tx}^{UE}||U_{Rx}^{BS}|}{N_{RF}^{BS}}} = \frac{\left(\frac{N_{RF}^{BS}}{KN_{RF}^{m}}\right)|U_{Tx}^{BS}||U_{Rx}^{UE}|}{|U_{Tx}^{UE}||U_{Rx}^{BS}|} + \frac{T_f N_{RF}^{BS}}{|U_{Tx}^{UE}||U_{Rx}^{BS}|}$$

The ratio $Q_t$ indicates the relative costs of downlink beamforming training and uplink beamforming training. A ratio $Q_t > 1$ indicates that downlink beamforming training takes a longer time than uplink beamforming training, and vice versa. In order to guarantee same accuracy for uplink beamforming and downlink beamforming training, a reasonable assumption is that the transmit and receive codebooks are assumed to have the same size. Given this assumption, we have $|U_{Tx}^{UE}|=|U_{Rx}^{UE}|=M^{UE}$ and $|U_{Tx}^{BS}|=|U_{Rx}^{BS}|=M^{BS}$ and Equation 1 simplifies to:

$$Q_t = \left(\frac{N_{RF}^{BS}}{KN_{RF}^{m}}\right) + \frac{T_f N_{RF}^{BS}}{M^{UE} M^{BS}} \quad \text{Eq. (2)}$$

From the expression for $Q_t$ (both in Equations 1 and 2), it is apparent that whenever $N_{RF}^{BS} > KN_{RF}^{m}$, downlink beamforming training will take longer time than uplink beamforming training. In words: if the number of RF chains at the network node 100 is larger than the total number of wireless devices 200 multiplied with the smallest number of RF chains in the wireless devices 200, then downlink beamforming training has more overhead than uplink beamforming training.

Equations 1 and 2, which assume that the codebook sizes for all wireless devices 200 is the same, can be extended to the case where the wireless devices 200 have different codebooks of possibly different sizes. Each wireless device j has access to a transmit codebook $U_{Tx}^{UE_j}$ and receive codebook $U_{Rx}^{UE_j}$. As in the previous embodiment, the network node 100 needs to transmit the beams from its transmit codebook $U_{Tx}^{BS}$, which takes in total $|U_{Tx}^{BS}|$ time slots. Wireless device k can listen to the projection of each transmit beam onto its channel $H_k$ and onto $N_{RF}^{k}$ receiving beams at UEs receiver chain. Hence, to learn the projections of all transmit beams from the network node 100 onto the channel $H_k$ and all the receiving beams at wireless device k, takes $$\frac{|U_{Tx}^{BS}||U_{Rx}^{UE_k}|}{N_{RF}^{k}}$$

time slots.

Because some wireless devices 200 need more training slots to learn the projections onto its receiving codebook, the network node 100 needs to transmit for as long as the training lasts for the wireless device 200 that takes most time slots. In other words, the total number of required downlink training slots equals $$\max_k \frac{|U_{Tx}^{BS}||U_{Rx}^{UE_k}|}{N_{RF}^{k}} = |U_{Tx}^{BS}|L_{Rx},$$

where we define $$L_{Rx} \triangleq \max_k \frac{|U_{Rx}^{UE_k}|}{N_{RF}^{k}}.$$

After the projections have been obtained by each wireless device 200, they are fed back in a sequential manner (one UE at a time), which takes in total $KT_f$ time slots. Hence, the total number of time slots for downlink beamforming training is $|U_{Tx}^{BS}|L_{Rx}+KT_f$ time slots. In this embodiment, the wireless device 200 that takes longest time to train mainly determines the signaling overhead for downlink beamforming training.

Similar to downlink beamforming training, it takes each wireless device 200 $|U_{Tx}^{UE_k}|$ time slots to transmit its beams. For each such beam, the network node 100 can listen how the beam projects onto the uplink channel (from that wireless device 200) and $N_{RF}^{BS}$ receive beams simultaneously at the network node 100. Hence, in total, it takes $$\frac{|U_{Tx}^{UE_k}||U_{Rx}^{BS}|}{N_{RF}^{BS}}$$

time slots to learn all the projections from a single wireless device 200 onto the channel and the receiving beams at the BS. Since there are K users, the total number of time slots for uplink beamforming training equals $$\frac{|U_{Rx}^{BS}|}{N_{RF}^{BS}}\sum_{k=1}^{K}|U_{Tx}^{UE_k}| = \frac{|U_{Rx}^{BS}|}{N_{RF}^{BS}}U_t,$$

where $U_t \triangleq \sum_{k=1}^{K}|U_{Tx}^{UE_k}|$ is the total number of transmit beams at all wireless devices 200.

In this embodiment, the ratio $Q_t$ of downlink beamforming training to uplink beamforming training is given by:

$$Q_t \stackrel{def}{=} \frac{\text{\# of DL training time slots}}{\text{\# of UL training time slots}} = \quad \text{Eq. (3)}$$

$$\frac{|U_{Tx}^{BS}|L_{Rx} + KT_f}{\frac{|U_{Rx}^{BS}|}{N_{RF}^{BS}}U_t} = \left(\frac{N_{RF}^{BS}L_{Rx}}{U_t}\right)\left(\frac{|U_{Tx}^{BS}|}{|U_{Rx}^{BS}|}\right) + \frac{KT_f N_{RF}^{BS}}{|U_{Rx}^{BS}|U_t}$$

If it is assumed that the transmit and receive codebooks for the network node 10 is the same size so that $|U_{Tx}^{BS}|=|U_{Rx}^{BS}|=M^{BS}$, Equation 3 reduces to:

$$Q_t = \left(\frac{N_{RF}^{BS}L_{Rx}}{U_t}\right) + \frac{KT_f N_{RF}^{BS}}{M^{BS}U_t} \quad \text{Eq. (4)}$$

From the expression of $Q_t$ in Equation 4, it can be seen that whenever $N_{RF}^{BS}L_{Rx} > U_t$, downlink beamforming training will take longer time than uplink beamforming training The comparison of signaling overhead for downlink beamforming training and uplink beamforming training in Equations 1-4 suggests a test that can be performed at the network node 100 when it needs to train K wireless devices 200. The ratio $Q_t$ may be computed and used as part of a selection criterion. As one example, a selection value may be computed as a function of $Q_t$ and compared to a selection threshold s. In the simplest case, the value of $Q_t$ is used as the selection value. In this case, if $Q_t$>s, then uplink beamforming training is used; otherwise downlink beamforming training is used. The value that serves as a selection threshold s should typically be larger or equal to 1 for deciding when downlink beamforming training is more beneficial than uplink beamforming training, and vice versa. The selection threshold s may include all extra (multiplicative) overhead that downlink beamforming training or uplink beamforming training might have. As an example, in order to increase the signal-to-noise (SNR) of uplink beamforming training, one can increase the training duration for uplink beamforming training by a factor $c_{UL}$. This extended duration results in that $Q_t$ in (1) and (2) should be divided by $c_{UL}$ (since the duration for uplink beamforming training is $c_{UL}$ times longer), and this constant can then instead be incorporated into the selection threshold s. Thus, the network node 100 training test above includes all multiplicative training duration increases.

In IEEE 802.11ay, a network node 100 with up to 256 antennas and up to 8 RF chains is envisioned, while the wireless devices 200 can have up to 20 antenna elements (depending on the scenario). However, a reasonable scenario is a network node 100 with, e.g., 128 antennas and 8 RF chains and wireless devices 200 with, e.g., 4 antennas and one RF chain. Assuming that each wireless device 200 has transmit and receive codebooks of the same size, i.e., with the same number of beamforming codes, and that the network node 100 intends to serve 4 wireless devices 200 in the downlink (i.e., K=4), we obtain $$Q_t = 2 + \frac{8T_f}{M^{UE}M^{BS}}.$$

In this case, the downlink beamforming training takes at least double the number of time slots compared to uplink beamforming training.

Figure 6:
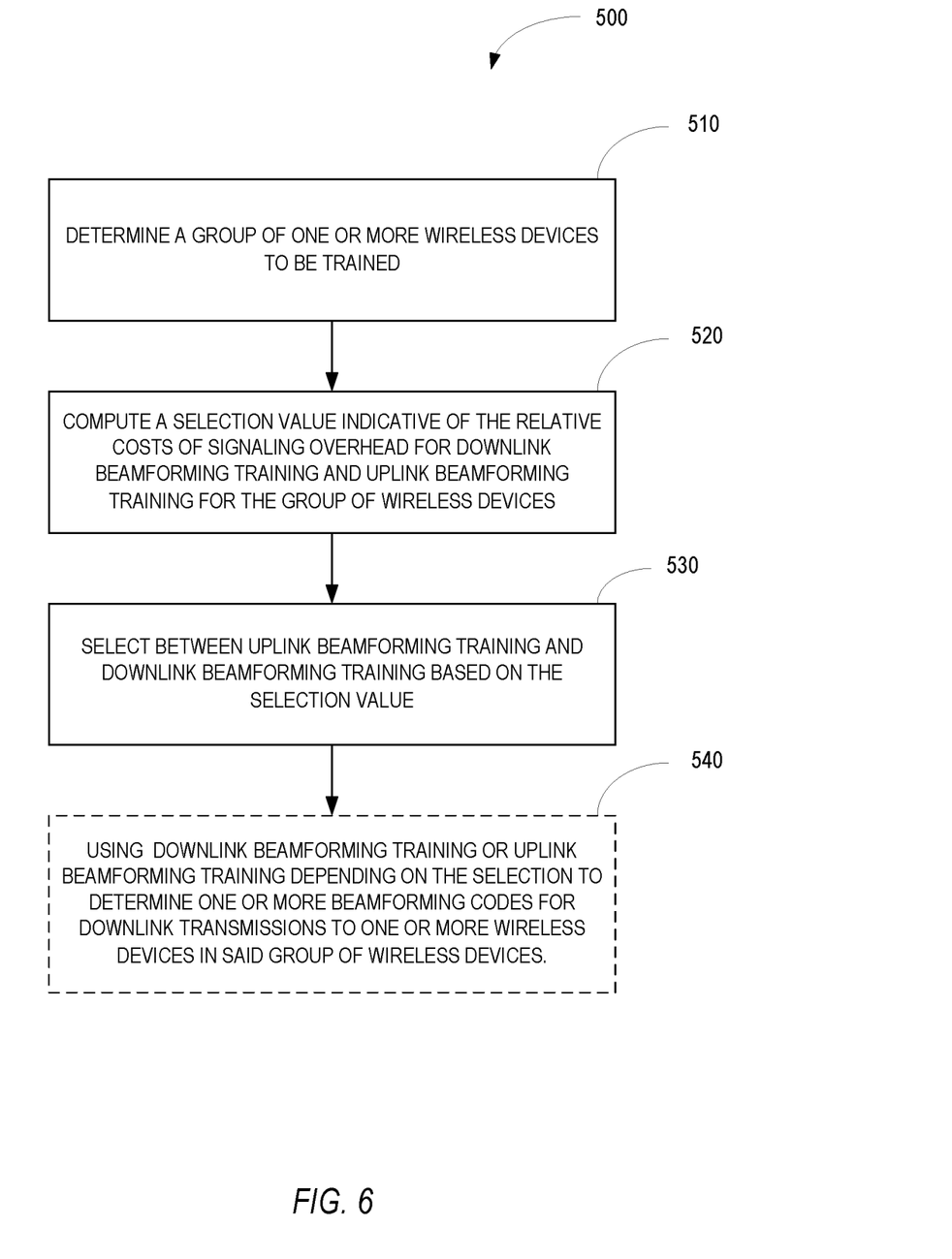
FIG. 6 illustrates an exemplary method of selecting a beamforming training method in a wireless communication network using hybrid beamforming.

FIG. 6 illustrates an exemplary method 500 implemented by a network node 100 for selecting between downlink beamforming training and uplink beamforming training. The network node 100 begins by determining a group of one or more wireless devices 200 to be trained (block 510). It should be noted that the group of wireless devices 200 to be trained can be more or less than the number of wireless devices 200 that the network node 100 will transit to on the downlink. The network node 100 computes a selection value indicative of the relative costs of signaling overhead for downlink beamforming training and uplink beamforming training to support downlink transmissions by the network node 100 to the group of wireless devices 200 using hybrid beamforming. (block 520). Signaling overhead may be expressed in terms of any resource, such as number of time slots used, number of subcarriers used, etc. The selection value may comprise, e.g., the ratio $Q_t$ given by Equation 1 or Equation 2. The network node 100 then selects between uplink beamforming training and downlink beamforming training based on the selection value (block 530). In some embodiments, the network node 100 uses the selected one of downlink beamforming training or uplink beamforming training to determine one or more beamforming codes for downlink transmissions to one or more wireless devices 200 in said group of wireless devices 200 (block 540).

Figure 7:
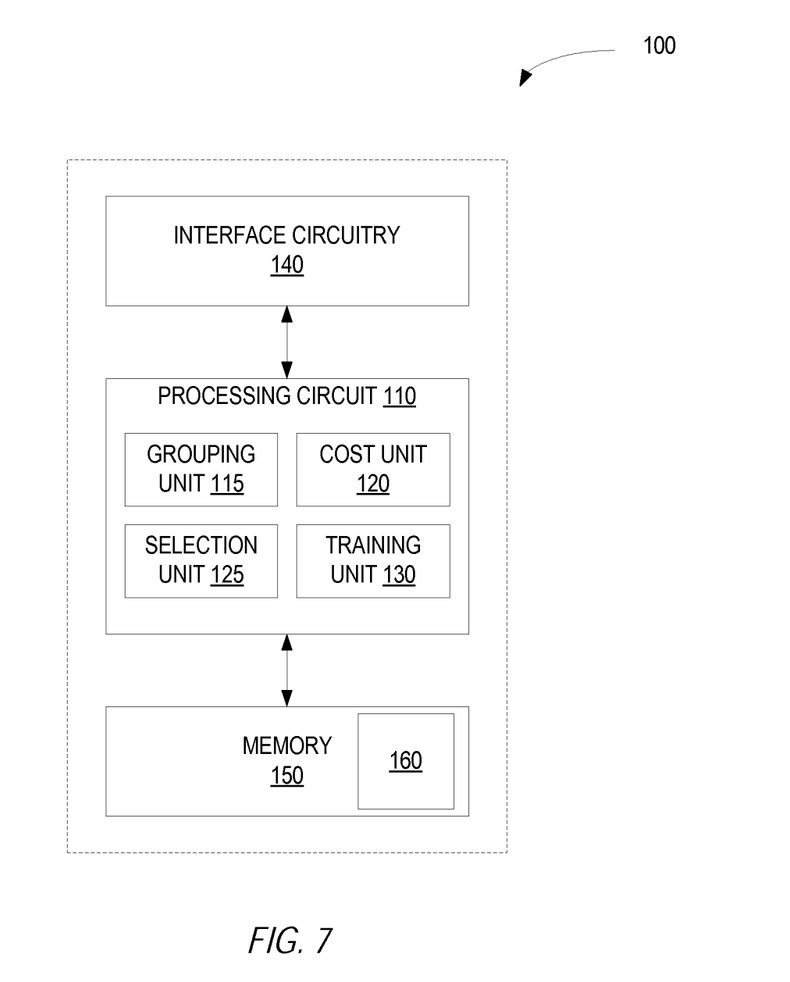
FIG. 7 illustrates an exemplary network node in a wireless communication network using hybrid beamforming.

FIG. 7 illustrates an exemplary network node 100 configured to operate as herein described. The network node 100 comprises a processing circuit 110, an interface circuit 140, and memory 150.

The interface circuit 140 is coupled to one or more antennas (not shown) and comprises the radio frequency (RF) components needed for communicating with the wireless devices 200 over a wireless communication channel. Typically, the RF components include a transmitter and receiver adapted for communications according to the 5G or NG standards or other standard using hybrid beamforming.

The processing circuit 110 processes the signals transmitted to or received by the network node 100. Such processing includes coding and modulation of transmitted signals, and the demodulation and decoding of received signals. In one embodiment, the processing circuit 110 comprises a grouping unit 115 for determining a group of wireless devices 200 to be served on the downlink, a cost unit 120 for computing the relative costs of downlink beamforming training and uplink beamforming training for the group of wireless devices 200, and a selection unit 125 to select one of downlink beamforming training and uplink beamforming training for the group of wireless devices 200. In some embodiments, the processing circuit 110 may further comprise a training unit 130 to perform either downlink beamforming training and uplink beamforming training depending on which is selected. The processing circuit 110 may comprise one or more microprocessors, hardware, firmware, or a combination thereof. In one embodiment, the grouping unit 115, cost unit 120, selection unit 125, and training unit 130 (if present) are implemented by a single microprocessor. In other embodiments, the grouping unit 115, cost unit 120, selection unit 125, and training unit 130 may implemented using different microprocessors.

Memory 150 comprises both volatile and non-volatile memory for storing computer program code and data needed by the processing circuit 410 for operation. Memory 150 may comprise any tangible, non-transitory computer-readable storage medium for storing data including electronic, magnetic, optical, electromagnetic, or semiconductor data storage. Memory 150 stores a computer program 160 comprising executable instructions that configure the processing circuit 110 to implement methods 500 according to FIG. 6. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, the computer program 160 for configuring the processing circuit 110 as herein described may be stored in a removable memory, such as a portable compact disc, portable digital video disc, or other removable media. The computer program 160 may also be embodied in a carrier such as an electronic signal, optical signal, radio signal, or computer readable storage medium.

While the disclosure focuses on the selection between downlink beamforming training and uplink beamforming training, those skilled in the art will appreciate that the methods and apparatus as herein described can be extended to selection involving any number of training methods.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method implemented by a network node in a wireless communication network using hybrid beamforming, the method comprising the network node:
   determining a group of one or more wireless devices to be trained;
   computing a selection value indicative of the relative costs of signaling overhead for downlink beamforming training and uplink beamforming training to support downlink transmissions by the network node to the group of wireless devices using hybrid beamforming; and
   selecting between uplink beamforming training and downlink beamforming training based on the selection value.

2. The method of claim 1:
   wherein the computing the selection value comprises computing a ratio of the signaling overhead for downlink beamforming training to the signaling overhead for uplink beamforming training; and
   wherein the ratio is used as a selection value.

3. The method of claim 2, wherein the computing the ratio of the signaling overhead for downlink beamforming training to the signaling overhead for uplink beamforming training comprises computing the ratio based on a number of radio frequency transmitter chains at the network node, a number of wireless devices in the group, and a minimum number of radio frequency receiver chains for the group of wireless devices.

4. The method of claim 2, wherein the computing the ratio of the signaling overhead for downlink beamforming training to the signaling overhead for uplink beamforming training comprises computing the ratio based on a number of radio frequency transmitter chains at the network node, and a maximum ratio for the group of wireless devices of receive codebook size to number of radio frequency receiver chains.

5. The method of claim 2, wherein the computation of the ratio of the signaling overhead for downlink beamforming training to the signaling overhead for uplink beamforming training is further based on codebook sizes for codebooks used respectively by the network node and the group of wireless devices.

6. The method of claim 2, wherein the computation of the ratio of the signaling overhead for downlink beamforming training to the signaling overhead for uplink beamforming training is further based on signaling overhead for feedback from the group of wireless devices to the network node.

7. The method of claim 1, wherein the selection value represents the relative costs in terms of time resources for downlink beamforming training and uplink beamforming training.

8. The method of claim 1, wherein computing the selection value comprises:
   computing a first value representative of the signaling overhead for downlink beamforming training;
   computing a second value representative of the signaling overhead number for uplink beamforming training; and
   computing the selection value based on the first and second values.

9. The method of claim 8, wherein the first and second values represent a number of time slots needed respectively for downlink beamforming training and uplink beamforming training.

10. The method of claim 8, wherein the selection value is computed as a ratio of the first and second values.

11. The method of claim 8, wherein:
    either:
        the first value is computed based on a size of a transmit codebook for the network node, a common receive codebook size for the group of wireless devices, and a minimum number of receiver chains for the group of wireless devices; and
        the second value is computed based on a size of a common transmit codebook for the group of wireless devices, a receive codebook size for the network node, and a number of receiver chains for the network node;
    or:
        wherein the first value is computed based on a size of a transmit codebook for the network node, and maximum ratio for the group of wireless devices of receive codebook size to number of receiver chains; and
        wherein the second value is computed based on a size of a common transmit codebook for the group of wireless devices, a receive codebook size for the network node, and a number of receiver chains for the network node.

12. The method of claim 1, wherein the selecting between uplink beamforming training and downlink beamforming training based on the selection value comprises:
    determining a selection threshold;
    comparing the selection value to the selection threshold; and
    selecting between downlink beamforming training and uplink beamforming training based on the comparison of the selection value to the selection threshold.

13. The method of claim 1, further comprising using the selected one of downlink beamforming training or uplink beamforming training to determine one or more beamforming codes for downlink transmissions to one or more wireless devices in the group of wireless devices.

14. A network node in a wireless communication network using hybrid beamforming, the network node comprising:
    an interface circuit for communicating with wireless devices; and
    a processing circuit configured to:
        determine a group of one or more wireless devices to be trained;
        compute a selection value indicative of the relative costs of signaling overhead for downlink beamforming training and uplink beamforming training to support downlink transmissions by the network node to the group of wireless devices using hybrid beamforming; and
        select between uplink beamforming training and downlink beamforming training based on the selection value.

15. The network node of claim 14, wherein the processing circuit is configured to:
    compute the ratio of the signaling overhead for downlink beamforming training to the signaling overhead for uplink beamforming training; and
    use the ratio as the selection value.

16. The network node of claim 15, wherein the processing circuit is configured to compute the ratio based on a number of radio frequency transmitter chains at the network node, a number of wireless devices in the group, and a minimum number of radio frequency receiver chains for the group of wireless devices.

17. The network node of claim 15, wherein the processing circuit is configured to compute the ratio based on a number of radio frequency transmitter chains at the network node, and a maximum ratio for the group of wireless devices of receive codebook size to number of radio frequency receiver chains.

18. The network node of claim 15, wherein the processing circuit is further configured to compute of the ratio of the signaling overhead for downlink beamforming training to the signaling overhead for uplink beamforming training based on codebook sizes for codebooks used respectively by the network node and the group of wireless devices.

19. The network node of claim 15, wherein the processing circuit is further configured to compute of the ratio of the signaling overhead for downlink beamforming training to the signaling overhead for uplink beamforming training based on signaling overhead for feedback from the group of wireless devices to the network node.

20. The network node of claim 14, wherein the selection value represents the relative costs in terms of time resources for downlink beamforming training and uplink beamforming training.

21. The network node of claim 14, wherein the processing circuit is configured to compute the selection value by:
   computing a first value representative of the signaling overhead for downlink beamforming training;
   computing a second value representative of the signaling overhead number for uplink beamforming training; and
   computing the selection value based on the first and second values.

22. The network node of claim 21, wherein the first and second values represent a number of time slots needed respectively for downlink beamforming training and uplink beamforming training.

23. The network node of claim 21, wherein the processing circuit is further configured to compute the selection value as a ratio of the first and second values.

24. The network node of claim 21, wherein the processing circuit is further configured to:
   either:
      compute the first value based on a size of a transmit codebook for the network node, a common receive codebook size for the group of wireless devices, and a minimum number of radio frequency receiver chains for the group of wireless devices; and
      compute the second value based on a size of a common transmit codebook for the group of wireless devices, a receive codebook size for the network node, and a number of radio frequency receiver chains for the network node;
   or:
      compute the first value based on a size of a transmit codebook for the network node, and maximum ratio for the group of wireless devices of receive codebook size to number of radio frequency receiver chains; and
      compute the second value based on a size of a common transmit codebook for the group of wireless devices, a receive codebook size for the network node, and a number of radio frequency receiver chains for the network node.

25. The network node of claim 14, wherein the processing circuit is further configured to select between uplink beamforming training and downlink beamforming training based on the selection value by:
   determining a selection threshold;
   comparing the selection value to the selection threshold; and
   selecting between downlink beamforming training and uplink beamforming training based on the comparison of the selection value to the selection threshold.

26. The network node of claim 14, wherein the processing circuit is further configured to use the selected one of downlink beamforming training or uplink beamforming training to determine one or more beamforming codes for downlink transmissions to one or more wireless devices in the group of wireless devices.

27. A non-transitory computer readable recording medium storing a computer program product for controlling a network node in a wireless communication network using hybrid beamforming, the computer program product comprising software instructions which, when run on processing circuitry of the network node, causes the network node to:
   determine a group of one or more wireless devices to be trained;
   compute a selection value indicative of the relative costs of signaling overhead for downlink beamforming training and uplink beamforming training to support downlink transmissions by the network node to the group of wireless devices using hybrid beamforming; and
   select between uplink beamforming training and downlink beamforming training based on the selection value.

* * * * *